US009874156B2

(12) United States Patent
Kobayashi et al.

(10) Patent No.: US 9,874,156 B2
(45) Date of Patent: Jan. 23, 2018

(54) CONTROL DEVICE FOR INTERNAL COMBUSTION ENGINE (71) Applicant: AISIN SEIKI KABUSHIKI KAISHA, Kariya-shi, Aichi (JP)

(72) Inventors: Masaki Kobayashi, Okazaki (JP); Masaaki Kaneko, Aichi (JP); Seiichi Fujimoto, Chiryu (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 14/772,029

(22) PCT Filed: Mar. 4, 2014

(86) PCT No.: PCT/JP2014/055345
§ 371 (c)(1),
(2) Date: Sep. 1, 2015

(87) PCT Pub. No.: WO2015/015824
PCT Pub. Date: Feb. 5, 2015

(65) Prior Publication Data
US 2016/0017821 A1    Jan. 21, 2016

(30) Foreign Application Priority Data

Jul. 31, 2013  (JP) .................................. 2013-159410

(51) Int. Cl.
F02D 13/02  (2006.01)
F02D 35/00  (2006.01)
(Continued)

(52) U.S. Cl.
CPC ........ *F02D 13/0261* (2013.01); *F01L 1/3442* (2013.01); *F01L 13/00* (2013.01);
(Continued)

(58) Field of Classification Search
CPC ............ F02D 13/0249; F02D 13/0261; F02D 13/0265; F02D 35/0007; F02D 41/30;
(Continued)

(56) References Cited

U.S. PATENT DOCUMENTS 6,062,201 A * 5/2000 Nozawa .............. F02D 13/0219
123/478
6,266,957 B1 * 7/2001 Nozawa .................... F01L 1/34
60/284
(Continued)

FOREIGN PATENT DOCUMENTS

CN    102042051 A    5/2011
EP    1 186 752 A2   3/2002
(Continued)

OTHER PUBLICATIONS

International Search Report (PCT/ISA/210) mailed on Jun. 10, 2014, by the Japanese Patent Office as the International Searching Authority for International Application No. PCT/JP2014/055345.
(Continued)

Primary Examiner — Hieu T Vo
Assistant Examiner — Arnold Castro
(74) Attorney, Agent, or Firm — Buchanan Ingersoll & Rooney PC (57) ABSTRACT The present invention is equipped with: a valve opening/closing timing control mechanism that sets the opening/closing timing of an exhaust valve; and a lock mechanism that holds the rotation phase of the valve opening/closing timing control mechanism in a first lock phase, in which the open state of the exhaust valve is maintained when the intake valve opens.

7 Claims, 7 Drawing Sheets (51) Int. Cl.
    F02D 41/30    (2006.01)
    F02M 25/07    (2006.01)
    F01L 13/00    (2006.01)
    F01L 1/344    (2006.01)
(52) U.S. Cl.
    CPC ..... F02D 13/0249 (2013.01); F02D 13/0265 (2013.01); F02D 35/0007 (2013.01); F02D 41/30 (2013.01); *F01L 2001/34426* (2013.01); *F01L 2001/34459* (2013.01); *Y02T 10/18* (2013.01)
(58) Field of Classification Search
    CPC .................... F01L 1/3442; F01L 13/00; F01L 2001/34426; F01L 2001/34459; Y02T 10/18
    USPC ...................................... 123/568.14
    See application file for complete search history.

(56) References Cited

U.S. PATENT DOCUMENTS

| | | | |
|---|---|---|---|
| 6,505,586 B1* | 1/2003 | Sato | F02D 13/0238 123/90.15 |
| 6,637,386 B2 | 10/2003 | Murata et al. | |
| 7,406,942 B2* | 8/2008 | Ashizawa | F02B 23/101 123/295 |
| 8,612,123 B2* | 12/2013 | Miura | F01L 1/022 123/90.15 |
| 2001/0015185 A1 | 8/2001 | Ogawa | |
| 2002/0062816 A1 | 5/2002 | Takahashi et al. | |
| 2002/0166522 A1* | 11/2002 | Takahashi | F01L 1/3442 123/90.15 |
| 2003/0070637 A1 | 4/2003 | Majima | |
| 2006/0201469 A1* | 9/2006 | Casal Kulzer | F02D 13/0215 123/179.18 |
| 2007/0144470 A1 | 6/2007 | Murase et al. | |
| 2007/0209618 A1 | 9/2007 | Leone | |
| 2009/0070007 A1 | 3/2009 | Natsui et al. | |
| 2009/0078223 A1* | 3/2009 | Nakamura | F01L 1/3442 123/90.17 |
| 2011/0088645 A1 | 4/2011 | Yamaguchi et al. | |
| 2012/0006290 A1* | 1/2012 | Noguchi | F01L 1/3442 123/90.15 |
| 2012/0085303 A1* | 4/2012 | Kobayashi | F01L 1/3442 123/90.15 |
| 2012/0152190 A1 | 6/2012 | Kobayashi et al. | |
| 2013/0118428 A1 | 5/2013 | Suzuki et al. | |
| 2013/0146005 A1 | 6/2013 | Watanabe | |
| 2014/0202407 A1* | 7/2014 | Miyamoto | F01L 1/3442 123/90.15 |
| 2014/0352639 A1 | 12/2014 | Kanai | |

FOREIGN PATENT DOCUMENTS

| | | |
|---|---|---|
| EP | 2 034 161 A2 | 3/2009 |
| JP | 2002-206436 A | 7/2002 |
| JP | 2003-120348 A | 4/2003 |
| JP | 4389383 B2 | 12/2009 |
| JP | 2013-068086 A | 4/2013 |
| JP | 2013-096376 A | 5/2013 |
| JP | 2013-119842 A | 6/2013 |
| JP | 2013-139825 A | 7/2013 |
| WO | 2012/086085 A1 | 6/2012 |
| WO | 2013/105247 A1 | 7/2013 |

OTHER PUBLICATIONS

Written Opinion (PCT/ISA/237) mailed on Jun. 10, 2014, by the Japanese Patent Office as the International Searching Authority for International Application No. PCT/JP2014/055345.

Takahiro Miura et al., "Development of a Hydraulic Variable Valve Timing Control System With an Optimum Angular Postion Locking Mechanism", SAE International, Apr. 16, 2012, 7 pages.

Notification of Transmittal of the Translation of the International Preliminary Report on Patentability (Forms PCT/IB/338 and Forms PCT/IB/373) and Written Opinion of the International Searching Authority (Forms PCT/ISA/237) issued on Feb. 11, 2016, by the International Bureau of WIPO in corresponding International Application No. PCT/JP2014/055345. (7 pgs).

The Extended European Search Report issued on Jul. 14, 2016, by the European Patent Office in corresponding European Patent Application No. 14831443.8-1603. (10 pages).

Notification of Reasons for Refusal dated Apr. 18, 2017 issued by the Japanese Patent Office in corresponding Japanese Patent Application No. 2015-529400 and English translation (9 pages).

* cited by examiner

Fig.10

CONTROL DEVICE FOR INTERNAL COMBUSTION ENGINE

TECHNICAL FIELD

The present invention relates to a control device for an internal combustion engine, and in particular to a technique for setting the timing of opening/closing an exhaust valve at the startup of the internal combustion engine.

BACKGROUND ART

The technology according to Patent Document 1 relates to a control device for an internal combustion engine having the above-described configuration. According to this technology, when the internal combustion engine is started up, unburned hydrocarbons (unburned HC) remaining in the combustion gas are trapped in the combustion chamber by advancing the closing timing of the valve opening/closing timing control mechanism for the exhaust valve. After the startup, an overlap period, during which both the exhaust valve and the intake valve are open, is extended by retarding the valve opening/closing timing control mechanism for the exhaust valve. Consequently, the exhaust gas that has been discharged to the exhaust passage is taken into the combustion chamber again, and the unburned HC gas contained in the exhaust gas contributes to combustion again, which leads to the reduction of emissions.

According to Patent Document 1, the valve opening/closing timing control mechanism (referred to as "valve timing control mechanism" in this document), which sets the timing of opening/closing the intake valve and the exhaust valve, is configured to be of an electromagnetic type including: a movable unit made of magnetic material; a coil for valve opening; and a coil for valve closing.

The technology according to Patent Document 2 also relates to a control device for an internal combustion engine. According to this technology, an inner rotor is provided at the tip of the camshaft, and an outer rotor, to which rotative power is transmitted from the camshaft, is fit onto the inner rotor. A fluid pressure chamber located between these rotors is partitioned by a vane into two chambers, namely an advancing chamber and a retarding chamber, and the fluid pressure chamber is configured such that the relative rotation phase of the crankshaft and the camshaft can be freely changed by supplying a fluid to either the advancing chamber or the retarding chamber.

According to Patent Document 2, in order to regulate the relative rotation phase of the inner rotor and the outer rotor, a first lock pin, which is biased by a spring, a first regulation groove, into which the first lock pin fits, a second lock pin, which is biased by a spring, and a second regulation groove, into which the second lock pin fits, are provided. Also, a configuration is adopted in which the relative rotation phase of the inner rotor and the outer rotor can be maintained to be a phase that is suited for the startup of the internal combustion engine in the state in which the first lock pin is fit into the first regulation groove and the second lock pin is fit into the second regulation groove.

CITATION LIST

Patent Literature

Patent Document 1: JP 2003-120348A (paragraph [0055], etc.)
Patent Document 2: JP 4389383B2

SUMMARY OF INVENTION

Technical Problem

At the startup of an internal combustion engine, fuel that was not burnt within the cylinder may be discharged as unburned HC in some cases. In particular, in situations where the internal combustion engine is in a low-temperature state, the amount of unburned HC discharge increases within a short period immediately after the startup. As described in Patent Document 1, the phenomenon of the increase of unburned HC is attributed to the fact that fuel adhering to the inner wall of the cylinder in the low-temperature state does not burn.

As described in Patent Document 1 for example, in order to eliminate this kind of inconvenience, it is possible to make an attempt to raise the temperature of the combustion chamber by maintaining the open state of the exhaust valve when the intake valve opens after the combustion gas is discharged, and takes a portion of the combustion gas, which has been discharged from the combustion chamber, into the combustion chamber.

However, in a configuration in which the intake valve and the exhaust valve are opened and closed by an electromagnetic method as in Patent Document 1, although the opening/closing timing of the intake valve and the exhaust valve can be freely set, the structure is complicated because the intake valve and the exhaust valve are opened and closed by an electromagnetic method.

Also, the valve opening/closing timing control mechanism described in Patent Document 2 does not suppress the amount of unburned HC discharge at the startup of the internal combustion engine, and there is room for improvement. Note that setting the opening/closing timing of the intake valve and the exhaust valve by a mechanical method as described in Patent Document 2 is more reliable than setting the opening/closing timing of the intake valve and the exhaust valve by an electromagnetic method.

The present invention aims to rationally construct a control device that is capable of suppressing the discharge of unburned HC when an internal combustion engine in the low-temperature state is started up.

Solution to Problem

The present invention is characterized by being a control device for an internal combustion engine that includes: a piston that moves between a top dead center and a bottom dead center; a crankshaft; a camshaft; and a combustion chamber, the control device including: an intake valve that opens/closes the combustion chamber such that air flows into the combustion chamber; and an exhaust valve that opens/closes the combustion chamber such that a combustion gas after combustion flows out of the combustion chamber, the control device including: a driving rotating body to which a rotational force is transmitted from the crankshaft; a driven rotating body that is housed within the driving rotating body so as to be rotatable relative to the driving rotating body, and that rotates integrally with the camshaft for opening/closing the exhaust valve; a lock mechanism that is switchable between a locked state, in which a relative rotation phase of the driving rotating body and the driven rotating body is held in a predetermined first lock phase, and an unlocked state, with which the locked state is released; a phase control valve that is capable of controlling the relative rotation phase of the driving rotating body and the driven rotating body, and the locked state due to the lock mechanism, by supplying/discharging a fluid to/from an advancing chamber or a retarding chamber, which are defined between the driving rotating body and the driven rotating body; and a control unit that controls the phase control valve, wherein opening/closing timings of the intake valve and the exhaust valve are set such that an open state of the exhaust valve is maintained when the relative rotation phase is held in the locked state by the lock mechanism and the piston moves from the top dead center toward the bottom dead center.

With this configuration, when the internal combustion engine is started up in a situation where the relative rotation phase of the driving rotating body and the driven rotating body is held in the first lock phase by the lock mechanism, the open state of the exhaust valve is maintained when the intake valve opens. Therefore, air is taken into the combustion chamber via the intake valve along with the operation of the piston, and simultaneously, the combustion gas discharged from the exhaust valve is also taken into the combustion chamber. Since the combustion gas is taken into the combustion chamber, the temperature of the inner wall of the cylinder increases, and fuel adhering to the inner wall of the cylinder evaporates and burns reliably, which suppresses the amount of unburned HC.

As a result, an internal combustion engine control device that is capable of suppressing unburned HC discharge when the internal combustion engine in the low-temperature state is started up is configured.

The present invention may include a temperature sensor that detects an ambient temperature, and when the ambient temperature detected by the temperature sensor is lower than a setting value and the internal combustion engine is to be stopped, the internal combustion engine may be stopped after the relative rotation phase is switched to the locked state by the control unit controlling the phase control valve.

With this configuration, when the internal combustion engine is stopped in a situation where, as in a cold region, the ambient temperature detected by the temperature sensor is lower than the setting value, the internal combustion engine is stopped in the state where the relative rotation phase of the driving rotating body and the driven rotating body is locked in the first lock phase. With this configuration, when the internal combustion engine is started up when the internal combustion engine is at a low temperature, unburned HC discharge can be suppressed by holding the relative rotation phase in the first lock phase. Note that it is not always necessary to lock the relative rotation phase of the driving rotating body and the driven rotating body when the ambient temperature detected by the temperature sensor is greater than or equal to the setting value.

In the present invention, the lock mechanism may be configured to be able to hold the relative rotation phase in a second lock phase, which is a phase that is different from the first lock phase, and when the ambient temperature detected by the temperature sensor is greater than or equal to the setting value and the internal combustion engine is to be stopped, the internal combustion engine may be stopped after the relative rotation phase transitions to the locked state, in which the relative rotation phase is held in the second lock phase by the control unit controlling the phase control valve.

With this configuration, when the internal combustion engine is stopped in a situation where the ambient temperature detected by the temperature sensor is greater than or equal to the setting value, the internal combustion engine is stopped in the state where the relative rotation phase of the driving rotating body and the driven rotating body is locked in the second lock phase. As a result, it is also possible to smoothly start up the internal combustion engine, with the relative rotation phase being held in the second lock phase.

That is, when the ambient temperature is greater than or equal to the setting value, the amount of unburned HC discharge is smaller than when the ambient temperature is lower than the setting value, and it is unnecessary to maintain the open state of the exhaust valve when the intake valve starts to open. For this reason, by locking the relative rotation phase in the second lock phase, it is possible to set the timing such that the intake valve starts to open after the exhaust valve closes, and start up the internal combustion engine with appropriate combustion.

In the present invention, when the lock mechanism is in a state of holding the relative rotation phase in the first lock phase and the internal combustion engine has been started up, the control unit may release the locked state of the lock mechanism upon elapse of a set period of time from startup of the internal combustion engine.

With this configuration, after the internal combustion engine is started up with the relative rotation phase of the driving rotating body and the driven rotating body being held in the first lock phase, it is also possible, by unlocking, to eliminate the situation where the exhaust valve continues to open with the intake valve being open, and to cause the transition to the relative rotation phase that can achieve high fuel efficiency. Also, since a large portion of the amount of unburned HC discharge is discharged at the startup of the internal combustion engine within a short period of time such as the period of a few seconds, it is possible to cause the transition to the high fuel efficiency operation state within a relatively short period of time by setting the setting time to be the period of a few seconds.

The present invention may be configured such that the internal combustion engine includes an injector that supplies fuel directly to the combustion chamber.

When the internal combustion engine in the low-temperature state is started up, it is likely that the phenomenon in which fuel supplied to the combustion chamber by the injector adheres to the cylinder inner wall occurs. With the configuration according to the present invention, when the internal combustion engine is started up at a low temperature, the open state of the exhaust valve is maintained when the intake valve opens, and consequently the temperature of the cylinder inner wall is increased by the combustion gas taken into the combustion chamber, and fuel adhering to the inner wall of the cylinder is caused to evaporate and burn reliably, which suppresses the amount of unburned HC.

In the present invention, the control device may include a lock control valve, wherein the lock control valve may control the locked state caused by the lock mechanism.

With this configuration, it is possible to control the locked state of the lock mechanism by using the lock control valve.

In the present invention, a valve opening/closing timing control mechanism that includes the driving rotating body, the driven rotating body, and the lock mechanism may be provided on an exhaust side.

With this configuration, it is possible to set the opening/closing timing of the exhaust valve by setting the relative rotation phase of the driving rotating body, to which a rotational force is transmitted from the crankshaft, and the driven rotating body, which rotates integrally with the intake valve, by using the valve opening/closing timing control mechanism.

The present invention may include a biasing mechanism that applies a biasing force to the relative rotation phase such that, under an operating condition where no driving force is caused by fluid pressure, the relative rotation phase is displaced in an advance direction against a cam average torque applied from the camshaft.

With this configuration, under an operating condition where no driving force is caused by fluid pressure, when the lock mechanism is in the unlocked state, it is possible to displace the relative rotation phase in the advance direction due to the biasing force from the biasing mechanism, even though the cam average torque of the camshaft acts in the retard direction. In particular, when the relative rotation phase is on the retard side of the first lock phase at the startup of the internal combustion engine, the relative rotation phase is displaced in the advance direction, in order to make it easier to transition to the locked state. Note that when the first lock phase is in the middle of the range of possible displacement of the relative rotation phase, excellent combustion can be achieved and emission can be improved even if the startup of the internal combustion engine is continued after the transition to the locked state. Also, when the relative rotation phase is on the advance side of the lock phase at the startup of the internal combustion engine, the relative rotation phase can be further displaced in the advance direction, which leads to the improvement of the startup performance of the internal combustion engine.

In the present invention, under an operating condition where no driving force is caused by fluid pressure, the biasing mechanism may apply a biasing force to the relative rotation phase such that, within a range from a range that is on a retard side of the first lock phase to the first lock phase, the relative rotation phase is displaced in the advance direction.

With this configuration, at the startup of the internal combustion engine, when the lock mechanism is in the unlocked state and the relative rotation phase is in the range on the retard side of the first lock phase for example, it is possible to displace the relative rotation phase to the first lock phase due to the biasing force of the biasing mechanism, and it is possible to cause the transition to the locked state, even though a torque that displaces the relative rotation phase in the retard direction is applied from the camshaft at the startup of the internal combustion engine. Then, by continuing the startup of the internal combustion engine after the transition to the first lock phase, it is possible to suppress the variations in the relative rotation phase and achieve stable startup.

In the present invention, the lock mechanism may include: a lock member that is supported so as to be shiftable with respect to one of the driving rotating body and the driven rotating body; a lock depression that is formed in the other one of the driving rotating body and the driven rotating body, and that the lock member is engageable with; and a biasing member that applies a biasing force to the lock member such that the lock member engages with the lock depression, and a depth of a regulation depression may be smaller than a depth of the lock depression, the regulation depression being continuous with the lock depression, and regulating the relative rotation phase from being displaced in a retard direction due to the lock member engaging therewith.

With this configuration, in the case of causing the lock mechanism to transition to the locked state in the first lock phase when the relative rotation phase is on the retard side of the first lock phase, the relative rotation phase is displaced in the advance direction, and consequently, the lock member engages with the regulation depression. In this engaged state, the relative rotation phase does not change significantly in the retard direction from the first lock phase even in situations where the relative rotation phase varies due to the torque applied from the camshaft for example, and the transition to the locked state easily occurs due to engagement with the lock depression in the first lock phase. Also, since the lock depression is deeper than the regulation depression, the locked state is kept stable.

DESCRIPTION OF EMBODIMENTS

The following describes embodiments of the present invention with reference to the drawings.

[Basic Configuration]

Figure 1:
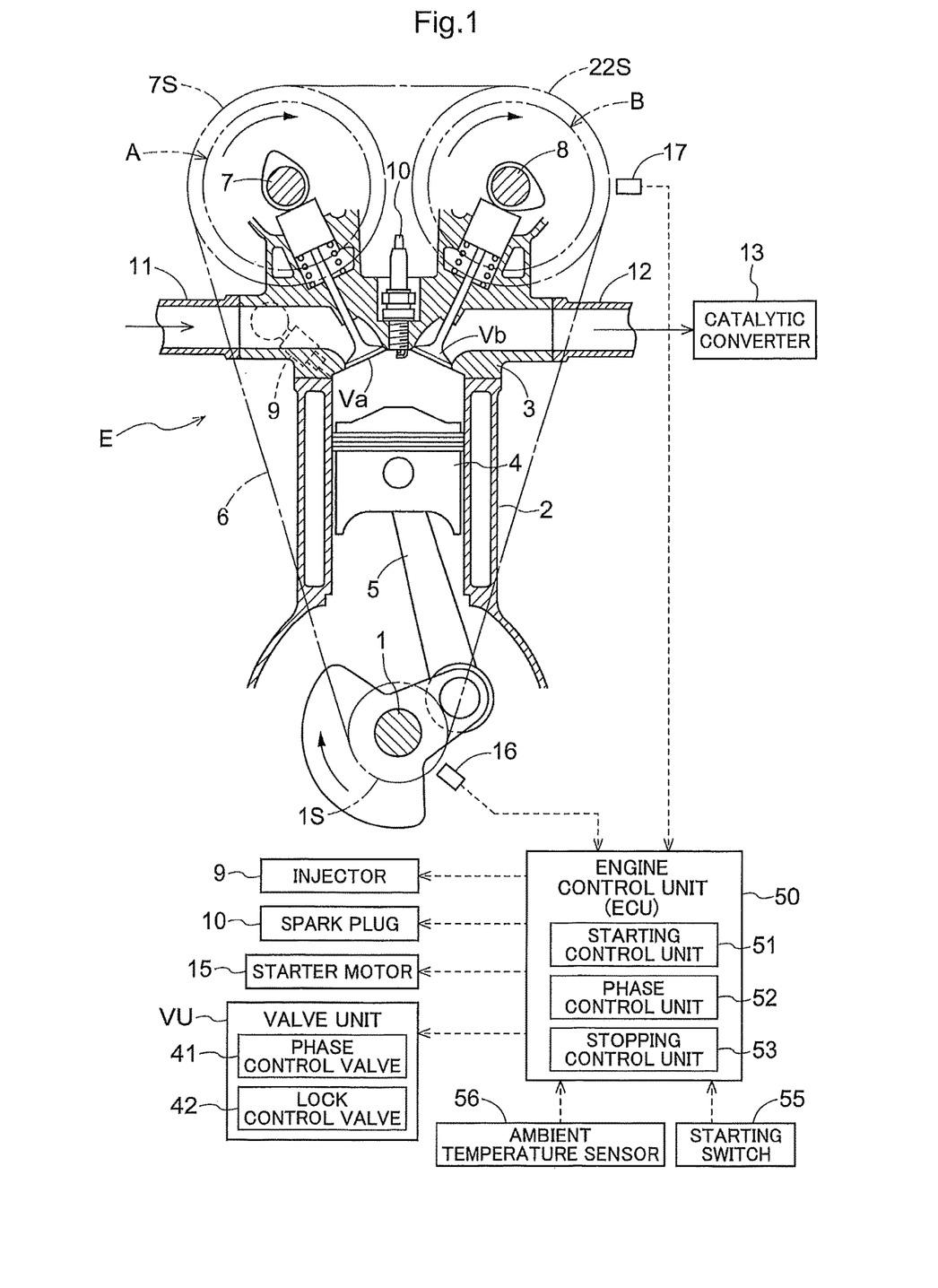
FIG. 1 is a diagram showing a configuration of a control device for an internal combustion engine.
Figure 2:
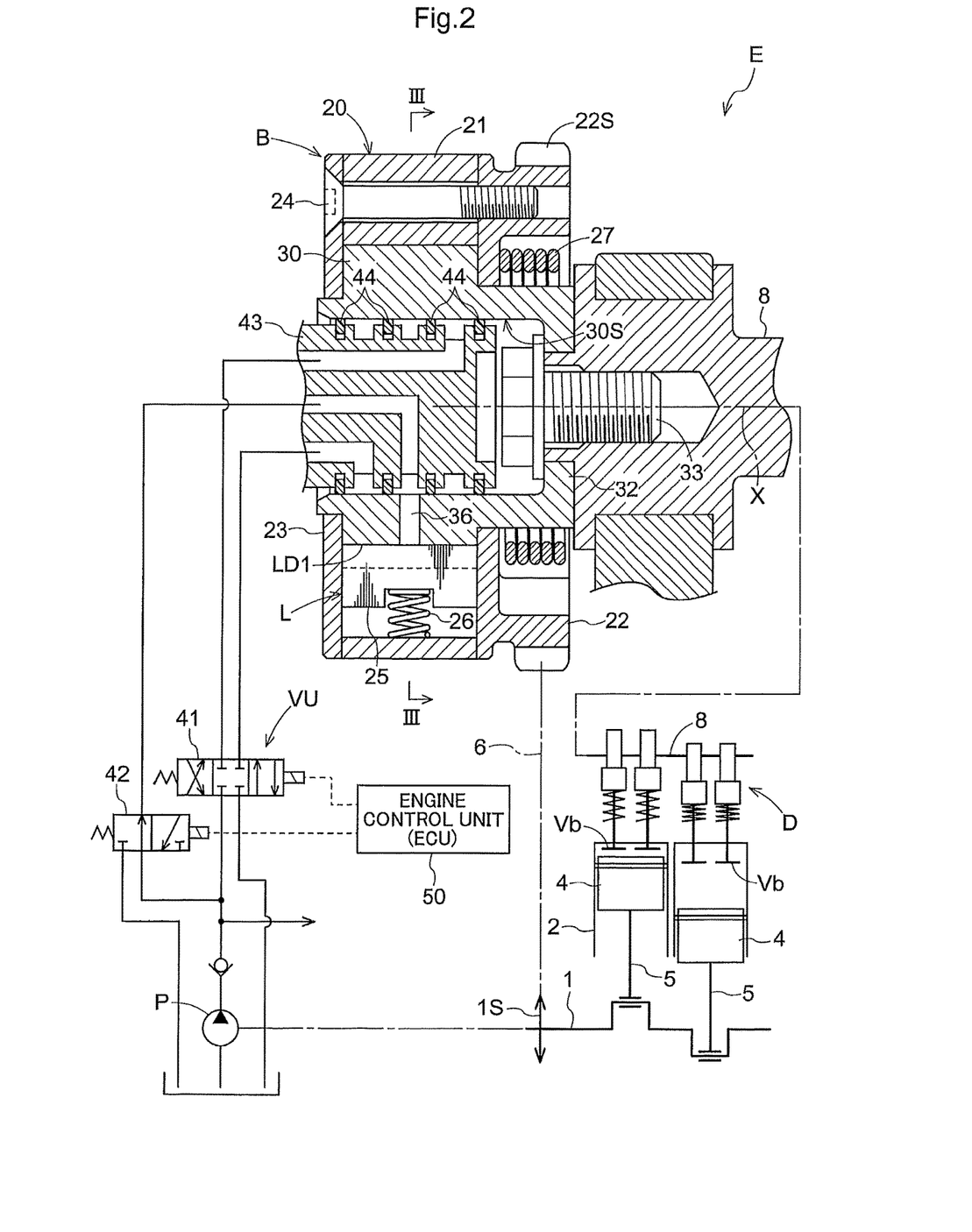
FIG. 2 is a diagram showing a valve opening/closing timing control mechanism and an oil passage system.

As shown in FIG. 1 and FIG. 2, a control device for an internal combustion engine is configured to include: an intake-side valve opening/closing timing control mechanism A, which sets the opening/closing timing of an intake valve Va of an engine E, which is the internal combustion engine; an exhaust-side valve opening/closing timing control mechanism B, which sets the opening/closing timing of an exhaust valve Vb; and an engine control unit (ECU) 50, which controls the engine E.

The engine E (an example of the internal combustion engine) shown in FIG. 1 is provided in a vehicle such as a car. The engine E is configured to be of the four-cycle type, in which: a cylinder head 3 is connected to an upper part of a cylinder block 2, which supports a crankshaft 1; a piston 4 is housed so as to be slidable in a plurality of cylinder bores formed in the cylinder block 2; and the piston 4 is connected to the crankshaft 1 by a connecting rod 5.

The cylinder head 3 is equipped with: the intake valve Va, which takes air into the combustion chamber; and the exhaust valve Vb, which discharges the combustion gas from the combustion chamber, and the cylinder head 3 is also equipped with: an intake camshaft 7, which controls the intake valve Va; and an exhaust camshaft 8, which controls the exhaust valve Vb. Also, a timing chain 6 is wound around an output sprocket 1S of the crankshaft 1, an outer circumferential sprocket 7S of the intake-side valve opening/closing timing control mechanism A, and a driving sprocket 22S of an outer rotor 20 (an example of the driving rotating body) of the exhaust-side valve opening/closing timing control mechanism B.

The cylinder head 3 is equipped with: an injector 9, which injects fuel into the combustion chamber; and a spark plug 10. An intake manifold 11, which supplies air to the combustion chamber via the intake valve Va, and an exhaust manifold 12, which discharges a combustion gas from the combustion chamber via the exhaust valve Vb, are connected to the cylinder head 3. Furthermore, a catalytic converter 13, which purifies the combustion gas, is provided downstream of the exhaust manifold 12 in the discharge direction.

The engine E is equipped with a starter motor 15, which transmits a driving rotational force to the crankshaft 1, and a shaft sensor 16, which detects the angle of rotation and the speed of rotation, is provided in the vicinity of the crankshaft 1. A phase sensor 17, which detects the relative rotation phase of the outer rotor 20 and an inner rotor 30, is provided in the vicinity of the exhaust-side valve opening/closing timing control mechanism B.

The engine control unit 50 is equipped with: a starting control unit 51; a phase control unit 52; and a stopping control unit 53. The starting control unit 51 controls the startup of the engine E. The phase control unit 52 operates a valve unit VU to control the relative rotation phase and a lock mechanism L of the exhaust-side valve opening/closing timing control mechanism B. The stopping control unit 53 controls the operation of the engine E when it stops. The lock mechanism L is configured to be switchable between a locked state, in which the relative rotation phase is held in a first lock phase LS1 or in a second lock phase LS2, and an unlocked state, in which the relative rotation phase is allowed to change.

Note that although the intake-side valve opening/closing timing control mechanism A and the exhaust-side valve opening/closing timing control mechanism B have commonalities in configuration and the engine control unit 50 controls the relative rotation phase and a lock mechanism L of the intake-side valve opening/closing timing control mechanism A, the following describes the configurations related to the control of the exhaust-side valve opening/closing timing control mechanism B because the present invention is characterized by the adjustment of the timing of opening/closing the exhaust valve Vb, which is performed by the exhaust-side valve opening/closing timing control mechanism B. The configurations related to the control, and the mode of controlling, are described below.

[Valve Opening/Closing Timing Control Mechanism]

Figure 3:
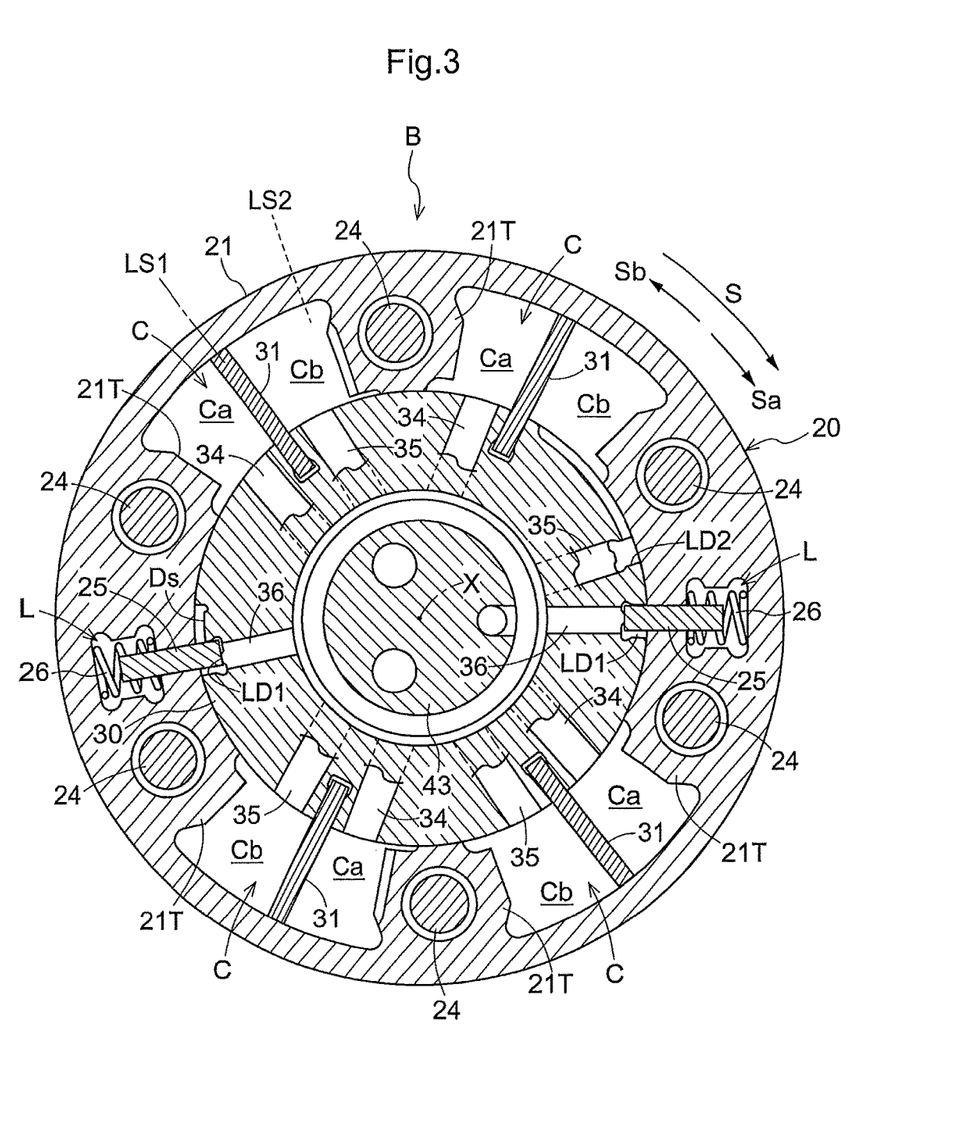
FIG. 3 is a cross-sectional view of the valve opening/closing timing control mechanism shown in FIG. 2, taken along the III-III line during a first lock phase.
Figure 4:
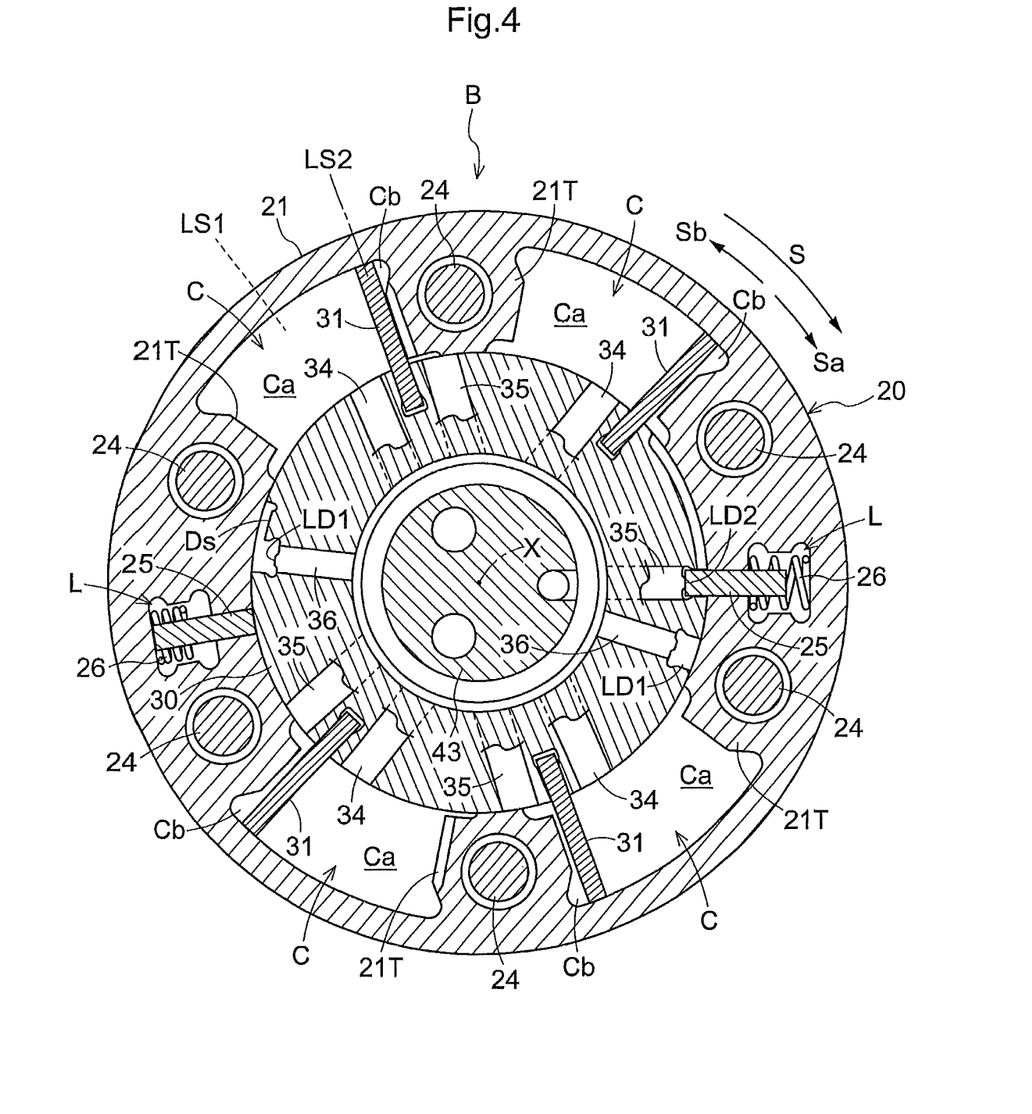
FIG. 4 is a cross-sectional view of the valve opening/closing timing control mechanism in a second lock phase.

As shown in FIG. 2 to FIG. 4, the exhaust-side valve opening/closing timing control mechanism B is equipped with: the outer rotor 20, which is a driving rotating body that rotates in synchronization with the crankshaft 1; and the inner rotor 30, which is a driven rotating body that is connected to the exhaust camshaft 8 with a connection bolt 33. These rotors are arranged to be coaxial with a rotational axis X of the exhaust camshaft 8, and they are supported so as to be able to rotate about the rotational axis X relative to each other, with the inner rotor 30 being housed in the outer rotor 20.

The exhaust-side valve opening/closing timing control mechanism B is configured to control the timing of opening/closing (the opening/closing timing of) the exhaust valve Vb by changing the relative rotation phase of the outer rotor 20 and the inner rotor 30 (hereinafter referred to as "the relative rotation phase").

In other words, the outer rotor 20 is configured to include: a rotor body 21, which is cylindrical; a rear block 22, which is located on one end portion of the rotor body 21 in the direction along the rotational axis X; and a front plate 23, which is located on the other end portion of the rotor body 21 in the direction along the rotational axis X. These elements are fastened to each other with a plurality of fastening bolts 24.

The driving sprocket 22S, to which the rotational force from the crankshaft 1 is transmitted, is formed on the outer circumference of the rear block 22, and the rotor body 21 is formed integrally with a cylindrical inner wall surface and a plurality of protrusions 21T, which protrude in the direction toward the rotational axis X (in the radially inward direction).

Guiding grooves are formed radially from the rotational axis X so as to correspond to, from among the plurality of protrusions 21T, two protrusions 21T that are located to face each other with the rotational axis X between them, and lock members 25, which each have a plate-like shape, are inserted in the guiding grooves so as to be able to extend and retract. Lock springs 26, which are biasing means that bias the lock members 25 toward the rotational axis X, are provided inside the rotor body 21.

In the exhaust-side valve opening/closing timing control mechanism B, when the relative rotation phase is in the first lock phase LS1 as shown in FIG. 3, the two lock members 25 fit into first lock depressions LD1 due to the biasing force of the lock springs 26, and hold the relative rotation phase. Also, when the relative rotation phase is displaced in an advance direction Sa from the first lock phase LS1 and reaches the second lock phase LS2 as shown in FIG. 4, only one of the lock members 25 is fitted into the corresponding second lock depression LD2 due to the biasing force of the lock spring 26, and holds the relative rotation phase.

A torsion spring 27 (an example of the biasing mechanism) is provided across the rear block 22 of the outer rotor 20 and the inner rotor 30. The torsion spring 27 is configured to apply a biasing force until the relative rotation phase reaches at least an intermediate phase, even from the maximum retard phase, for example. Also, the biasing force of the torsion spring 27 is set such that, within the range from the maximum retard phase to the first lock phase LS1, the relative rotation phase of the valve opening/closing timing control mechanism B is displaced in the advance direction Sa against the cam average torque applied from the exhaust camshaft 8.

In the case of starting up the engine E after the engine E stops without the transition of the lock mechanism L to the locked state as in the case of a stall of the engine, the amount of working oil supplied from a hydraulic pump P is not sufficient, and accordingly the relative rotation phase varies, which causes vibrations due to the effect of the torque, which varies along with the rotation of the exhaust camshaft 8.

In contrast, since the valve opening/closing timing control mechanism B is equipped with the torsion spring 27, even in the case where the engine E is started up in a situation where the relative rotation phase is on the retard side of the first lock phase LS1 and working oil cannot be supplied from the hydraulic pump P, the biasing force of the torsion spring 27 suppresses the variations in the relative rotation phase caused by the variations in the torque applied from the exhaust camshaft 8. In addition, since the biasing force of the torsion spring 27 is set to be greater than the cam average torque applied from the exhaust camshaft 8, the biasing force displaces the relative rotation phase in the direction toward the first lock phase LS1, which reduces the time required for the transition to the locked state. After the lock mechanism L thus transitions to the locked state, it is possible to stably start up the engine E with the relative rotation phase being held in the first lock phase LS1.

The lock mechanism L includes: the lock member 25, which is supported by the outer rotor 20 so as to be able to shift in the direction toward or away from the rotational axis X; the lock spring 26, which is the biasing member that biases the lock member 25 in the protruding direction; and a lock depression (the first lock depression LD1/the second lock depression LD2), which is formed in the inner rotor 30. Although the lock member 25 has a plate-like shape, its shape is not limited to a plate-like shape, and may be a rod-like shape, for example. Also, the lock member 25 may be supported by the inner rotor 30, and the lock mechanism L may be configured such that the lock depression is formed in the outer rotor 20.

The lock mechanism L is equipped with a regulation depression Ds, which regulates, with respect to the area that is continuous with the first lock depression LD1, the displacement of the relative rotation phase in the retard side (in the retard direction Sb) due to the lock member 25 engaging with it. The regulation depression Ds is formed so as to be continuous with the first lock depression LD1 and have a groove-like shape that is shallower than that of the first lock depression LD1, and reduces the variation range of the relative rotation phase due to the lock member 25 engaging with it. In other words, when the lock member 25 engages with the regulation depression Ds, the relative rotation phase of the outer rotor 20 and the inner rotor 30 is allowed to vary only within the range where the regulation depression Ds is formed (from the phase that is adjacent to the first lock depression LD1 to the phase that is farthest from the first lock depression LD1). Then, after the lock member 25 engages with the regulation depression Ds, the lock member 25 easily transitions to the state of engaging with the first lock depression LD1, in the same manner as in a ratchet mechanism.

For the reasons above, in the case where the engine E is started up in a situation where the relative rotation phase is on the retard side of the first lock phase LS1, the amount of variation in the relative rotation phase is reduced by causing the lock member 25 to engage with the regulation depression Ds, using the phenomenon in which the relative rotation phase of the valve opening/closing timing control mechanism B varies due to the torque applied from the exhaust camshaft 8. After that, by utilizing the displacement of the relative rotation phase in the advance direction Sa, which is caused by the supply of working oil, or the variation in the relative rotation phase, it is possible to immediately achieve the transition to the locked state in the first lock phase LS1.

In particular, in the present embodiment, since the torsion spring 27, which displaces the relative rotation phase in the advance direction, is provided, and the lock mechanism L is equipped with the regulation depression Ds, which reduces the variation range of the relative rotation phase, it is possible to immediately achieve the locked state by displacing the relative rotation phase to the first lock phase LS1, even in the case of starting up the engine E in a situation where the relative rotation phase is on the retard side of the first lock phase LS1.

In the exhaust-side valve opening/closing timing control mechanism B, the outer rotor 20 rotates in a driving rotation direction S due to the driving force transmitted from the timing chain 6. In relation to the outer rotor 20, the rotation direction of the inner rotor 30 that is the same as the driving rotation direction S is referred to as the advance direction Sa, and the reverse rotation direction is referred to as the retard direction Sb. In the exhaust-side valve opening/closing timing control mechanism B, the opening timing and the closing timing of the exhaust valve Vb are advanced by displacing the relative rotation phase in the advance direction Sa. Conversely, the opening timing and the closing timing of the exhaust valve Vb are retarded by displacing the rotation phase in the retard direction Sb.

Figure 6:
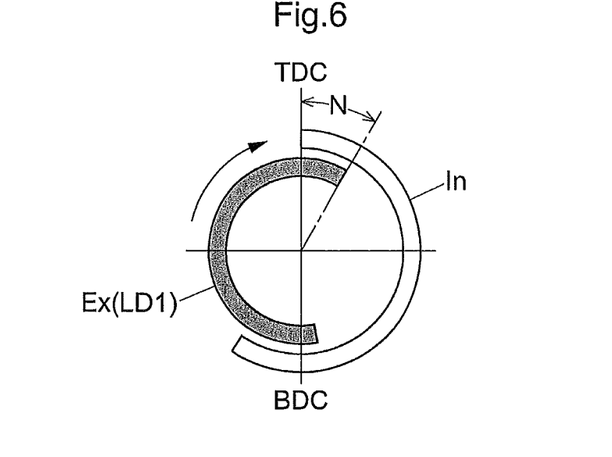
FIG. 6 is a chart showing opening/closing operations of an exhaust valve and an intake valve in the state of being maintained in the first lock phase.

The chart shown in FIG. 6 indicates, with respect to a situation where the relative rotation phase of the exhaust-side valve opening/closing timing control mechanism B is held in the first lock phase LS1, an intake range In, in which the intake valve Va is open, and an exhaust range Ex, in which the exhaust valve Vb is open, based on the operations of the piston 4. In this chart, the clockwise direction indicated by the arrow represents the flow of time, and in a situation where the opening/closing timing of the intake-side valve opening/closing timing control mechanism A is fixed, the operations are performed as described below.

As can be understood from the drawing, in a situation where the exhaust-side valve opening/closing timing control mechanism B is held in the first lock phase LS1, an overlap range N, which is the overlap of the exhaust range Ex, in which the exhaust valve Vb is open, and the intake range In, in which the intake valve Va is open, is formed when the piston 4 reaches the top dead center TDC and the intake valve Va opens. In other words, the exhaust valve Vb is kept open when the intake valve Va opens.

Due to the overlap range N being thus formed, the combustion gas burnt in the combustion chamber is discharged from the exhaust valve Vb in the open state along with the piston 4 moving upward. When the piston 4 reaches the top dead center TDC, the intake valve Va opens, and air is taken into the combustion chamber via the intake valve Va along with the piston 4 moving downward. At the time of this intake, a portion of the high-temperature combustion gas can also be taken into the combustion chamber via the exhaust valve Vb.

Figure 7:
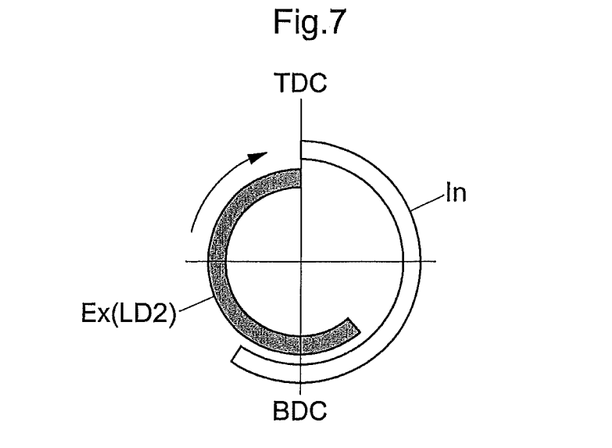
FIG. 7 is a chart showing opening/closing operations of the exhaust valve and the intake valve in a state of being maintained in the second lock phase.

In contrast, the chart shown in FIG. 7 indicates, with respective to a situation where the relative rotation phase of the exhaust-side valve opening/closing timing control mechanism B is held in the second lock phase LS2, the intake range In, in which the intake valve Va opens, and the exhaust range Ex, in which the exhaust valve Vb opens, based on the operations of the piston 4. Also in this chart, the clockwise direction indicated by the arrow represents the flow of time.

Specifically, in a situation where the relative rotation phase of the exhaust-side valve opening/closing timing control mechanism B is held in the second lock phase LS2, the exhaust valve Vb is closed when the piston 4 reaches the top dead center TDC. The intake valve Va opens at the same time and takes air into the combustion chamber.

Figure 8:
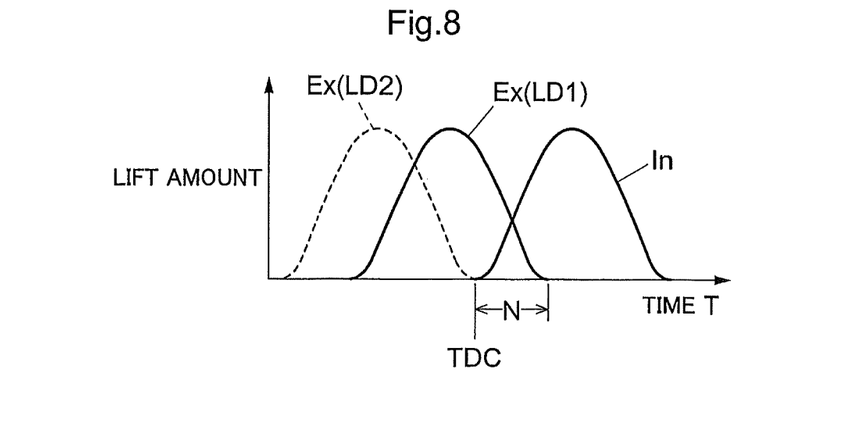
FIG. 8 is a graph showing the lift amounts of the exhaust valve and the intake valve based on the elapse of time.

In a graph that represents such a mode of operations with the vertical axis indicating the lift amount of the intake valve Va and the exhaust valve Vb, and the horizontal axis indicating the flow of time T, the overlap range N is, as shown in FIG. 8, formed between the intake range In and the exhaust range Ex in a situation where the exhaust-side valve opening/closing timing control mechanism B is held in the first lock phase LS1. Note that the length of the overlap range N can also be changed by unlocking the lock mechanism L and changing the opening/closing timing.

The inner rotor 30 has: an inner circumferential surface 30S, which has the shape of the inner surface of a cylinder that is coaxial with the rotational axis X; and a cylindrical outer circumferential surface, which is centered around the rotational axis X, and a plurality of vanes 31 are embedded in the outer circumferential surface so as to protrude outward. The vanes 31 are biased in the direction away from the rotational axis X by a spring or the like, and their protruding ends are brought into contact with the inner circumferential surface of the outer rotor 20, which provides fluid pressure chambers C. Of the inner rotor 30, one end portion in the direction along the rotational axis X is formed as a flange-like portion 32, and the inner rotor 30 is connected to the exhaust camshaft 8 by the connection bolt 33, which is inserted through the hole defined by the inner periphery of the flange-like portion 32.

Also, the inner rotor 30 is fit into (housed in) the outer rotor 20, and the fluid pressure chambers C are defined between the inner surface (the cylindrical inner wall surface and the plurality of protrusions 21T) of the rotor body 21 and the outer circumferential surface of the inner rotor 30. Furthermore, the fluid pressure chambers C are respectively partitioned by the vanes 31, and thus advancing chambers Ca and retarding chambers Cb are formed.

With this configuration, the relative rotation phase is displaced in the advance direction Sa by supplying working oil (an example of the fluid) to the advancing chambers Ca, and the relative rotation phase is displaced in the retard direction Sb by supplying working oil to the retarding chambers Cb. The relative rotation phase when the vanes 31 reach their moving ends (the limits of rotation about the rotational axis X) in the advance direction Sa is referred to as the maximum advance phase, and the relative rotation phase when the vanes 31 reach their moving ends (the limits of rotation about the rotational axis X) on the retard side is referred to as the maximum retard phase.

The outer circumference of the inner rotor 30 has: the pair of first lock depressions LD1, into which the pair of lock members 25 fit when the relative rotation phase reaches the first lock phase LS1; and the single second lock depression LD2, into which the lock members 25 fit when the relative rotation phase reaches the second lock phase LS2. The first lock phase LS1 is set to be a phase that is substantially in the middle of the maximum advance phase and the maximum retard phase, and the second lock phase LS2 is set to be a phase that is the maximum advance phase or is closer to the maximum advance phase than the first lock phase LS1.

The inner rotor 30 has: advancing channels 34, which are in communication with the advancing chambers Ca; retarding channels 35, which are in communication with the retarding chambers Cb; and unlocking channels 36, which supply working oil in the unlock directions with respect to the first lock depressions LD1. The second lock depression LD2 is formed to be in communication with the retarding chamber Cb, and the retarding channel 35 is in communication with the second lock depression LD2.

[Valve Unit]

The valve unit VU has a configuration in which a phase control valve 41 and a lock control valve 42 are housed within a unit case, and a flow passage formation shaft 43, which is formed integrally with the unit case, is provided in the state of being inserted in an inner circumferential surface 30S of the inner rotor 30. The outer circumferential surface of the flow passage formation shaft 43 has: a groove-like part that is in communication with a port of the phase control valve 41; and a groove-like part that is in communication with a port of the lock control valve 42, and a plurality of ring-like seals 44 are provided between the outer circumference of the passage formation shaft 43 and the inner circumferential surface 30S of the inner rotor 30 so as to separate the groove-like parts from each other.

The phase control valve 41 supplies working oil to either one of the advancing channels 34 or the retarding channels 35 selectively, and discharges oil from the other one, thereby achieving the operation to displace the relative rotation phase in the advance direction Sa or the retard direction Sb. Also, the lock control valve 42 in the first lock phase LS1 supplies working oil to the unlocking channel 36, thereby operating the pair of lock members 25 in the unlock directions against the biasing forces of the lock springs 26, and achieving the unlocking of the pair of lock members 25. Note that when the relative rotation phase is held in the second lock phase LS2, the unlocking of the lock member 25 fitting in the second lock depression LD2 is achieved by supplying working oil to the retarding channels 35 and thereby operating the lock member 25 against the biasing force of the lock spring 26.

The engine E is equipped with the hydraulic pump P, which is driven by the engine E so as to supply oil in an oil pan as working oil. Flow passages are configured such that working oil from the hydraulic pump P is supplied to the valve unit VU.

Although the drawings show only the valve unit VU for the exhaust-side valve opening/closing timing control mechanism B, a valve unit for the intake-side valve opening/closing timing control mechanism A is also provided, and the engine control unit 50 also changes the relative rotation phase of the intake-side valve opening/closing timing control mechanism A by operating the valve unit. Also, although the phase control valve 41 and the lock control valve 42 are shown in the valve unit VU, the valve unit VU may be configured without the lock control valve 42 by constructing the phase control valve 41 to be able to unlock the lock mechanism L.

[Engine Control Unit]

As shown in FIG. 1, the engine control unit 50 achieves control by software by using a microprocessor, a DSP, etc., and the starting control unit 51, the phase control unit 52, and the stopping control unit 53 are configured as software. Note that they may be configured as hardware, or a combination of software and hardware.

As described above, the starting control unit 51 controls the startup of the engine E. The phase control unit 52 operates the valve unit VU to control the relative rotation phase and the lock mechanism L of the exhaust-side valve opening/closing timing control mechanism B. The stopping control unit 53 controls the operation of the engine E when it stops.

The vehicle is equipped with a starting switch 55 for starting up and stopping the engine E by a manual operation. Also, the body of the vehicle is equipped with an ambient temperature sensor 56, which mainly detects the outdoor air temperature as the ambient temperature. Although it is assumed here that the ambient temperature sensor 56 is provided outside the body of the vehicle, it may be disposed inside the engine room.

The engine control unit 50 receives input signals from the shaft sensor 16, the phase sensor 17, the starting switch 55, and the ambient temperature sensor 56. The engine control unit 50 also outputs control signals to the control part of the injector 9, the control part of the spark plug 10, the control part of the starter motor 15, and the valve unit VU.

The starting control unit 51 is set to be in a basic control mode so as to start up the engine E by operating the starter motor 15 and controlling the injector 9 and the spark plug 10 by acquiring startup information from the starting switch 55.

During the operation of the engine E, the phase control unit 52 sets the relative rotation phase of the exhaust-side valve opening/closing timing control mechanism B to be a required value by controlling the valve unit VU while feeding back the relative rotation phase from the phase sensor 17 based on the rotation speed and the engine load of the engine E. Also, the phase control unit 52 unlocks the lock mechanism L when it is in the locked state.

When the engine E is to be stopped (when an operation to stop the engine is performed), the stopping control unit 53 sets the relative rotation phase of the exhaust-side valve opening/closing timing control mechanism B based on the result of detection by the ambient temperature sensor 56, and then stops the engine E by controlling the injector 9 and the spark plug 10.

[Control Mode: Engine Stopping Routine]

In the engine E according to the present embodiment, fuel is supplied from the injector 9 to the combustion chamber by injection, and when the engine E in the low-temperature state is started up, a portion of the fuel adheres to the cylinder inner wall, which constitutes the combustion chamber. When the cylinder inner wall is at a low temperature, the adhering portion of the fuel hardly evaporates and remains on the cylinder inner wall even after combustion caused by ignition, and the portion of the fuel is discharged as unburned HC (unburned hydrocarbons) together with the combustion gas.

Since the internal temperature of the catalytic converter 13 is also low when the engine E is started up, the unburned HC is not processed by the catalytic converter 13 and are discharged together with the exhaust gas, which causes a degradation in terms of emissions.

In order to eliminate the inconvenience of the degradation in terms of emissions at the startup of the engine E, the control mode of the control device of the internal combustion engine according to the present invention is set such that, when the engine E is stopped in a situation where the ambient temperature is lower than the setting value, the exhaust-side valve opening/closing timing control mechanism B is held in the first lock phase LS1, and the engine is stopped after this holding operation. The outline of this control is described below.

Figure 9:
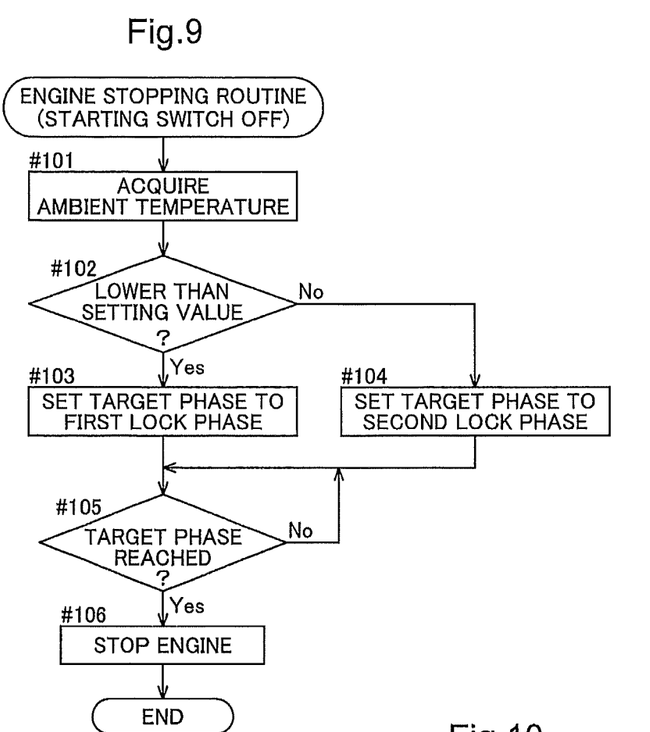
FIG. 9 is a flowchart for an engine stopping routine.

Specifically, as shown in the flowchart in FIG. 9, in the case where the engine E is stopped by a manual OFF operation with the starting switch 55, the stopping control unit 53 acquires the ambient temperature from the detection signal of the ambient temperature sensor 56 (step #101), and when the ambient temperature is lower than the setting value, sets the target phase for the exhaust-side valve opening/closing timing control mechanism B to the first lock phase LS1 (steps #102, 103).

Also, when the ambient temperature from the detection signal of the ambient temperature sensor 56 is greater than or equal to the setting value, the stopping control unit 53 sets the target phase for the exhaust-side valve opening/closing timing control mechanism B to the second lock phase LS2 (steps #102, 104).

After this setting operation, the stopping control unit 53 controls the phase control valve 41, while feeding back the detection signal of the phase sensor 17, until the relative rotation phase reaches the target phase, and then stops the engine E (steps #105, #106).

In this control, when the relative rotation phase reaches the first lock phase LS1, the two lock members 25 fit into the first lock depressions LD1 due to the biasing forces of the lock springs 26. Also, when the relative rotation phase reaches the second lock phase LS2, one of the lock members 25 fits into the second lock depression LD2 due to the biasing force of the lock spring 26.

[Another Control Mode of Engine Stopping Routine]

When the control device for an internal combustion engine according to the present invention is applied to a hybrid-type vehicle or an idling stop-type vehicle, the control mode may be set as follows. That is, in the case of a hybrid-type vehicle, the engine E is automatically started up to charge the battery, and the engine E is automatically stopped upon completion of charging. In the case of an idling stop-type vehicle, the engine E is stopped when the brake pedal is pushed, and the engine E is automatically started up when the brake pedal is released.

Regardless of which control is performed in the vehicle, after the engine E is stopped, the engine E is started up in a situation where the temperature of the engine E does not decrease. In a situation where the engine E is started up in a warm state, the control mode may be set such that the relative rotation phase is set to the second lock phase LS2 without referring to the result of detection by the ambient temperature sensor 56, and the engine E is stopped after this setting operation.

In other words, the control mode can be set such that the result of detection by the ambient temperature sensor 56 is referred to and is reflected to the lock phase only when a manual operation is performed as the operation to stop the engine E.

[Control Mode: Engine Starting Routine]

Figure 10:
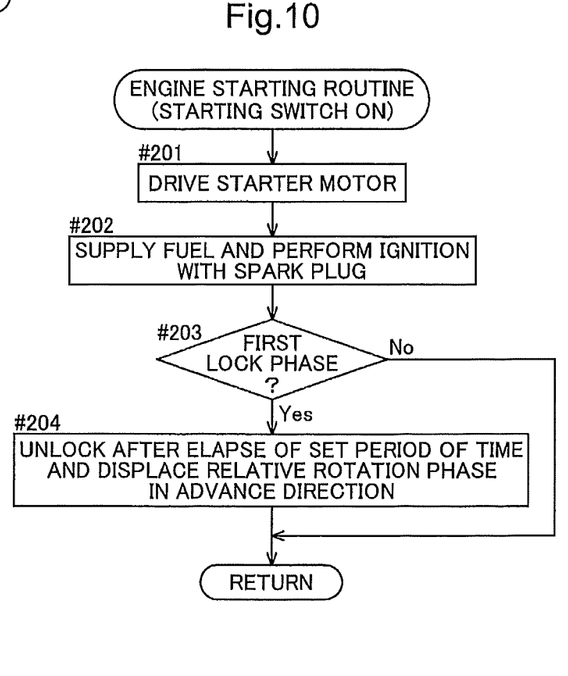
FIG. 10 is a flowchart for an engine starting routine.

In the case where the engine E is started up by a manual ON operation with the starting switch 55, the starting control unit 51 drives the starter motor 15 to perform cranking, supplies fuel from the injector 9 to the combustion chamber, and performs ignition by using the spark plug 10 (steps #201, #202).

In this way, in the case where the relative rotation phase is held in the first lock phase LS1 when the engine E is started up, the starting control unit 51, after a set period of time elapses after cranking, controls the lock control valve 42 to unlock the lock mechanism L, and also controls the phase control valve 41 to displace the relative rotation phase in the advance direction Sa (steps #203, #204).

According to this control, a relatively short period of time, such as a period of a few seconds, is set as the set period, and upon elapse of this set period, the biasing forces of the lock springs 26 are unlocked by supplying working oil to the unlocking channel 36 and thereby applying a pressure against the lock members 25 that are fit in the first lock depressions LD1.

Also, the relative rotation phase of the exhaust-side valve opening/closing timing control mechanism B is held in the first lock phase LS1 during the set period, and thus the overlap range N, which is the overlap of the exhaust range Ex, in which the exhaust valve Vb is open, and the intake range In, in which the intake valve Va is open, is formed in the range where air intake is started, as shown in FIG. 6 and FIG. 8.

In particular, at the startup of the engine E, the pressure of working oil supplied from the hydraulic pump P is low, and the amount of oil is insufficient, and accordingly it is impossible to hold the relative rotation phase in a desired phase by controlling the phase control valve 41 to supply working oil to the exhaust-side valve opening/closing timing control mechanism B. Considering such a problem, the present invention achieves stable control by holding the relative rotation phase in the first lock phase LS1 by using the lock mechanism L, without depending on the oil pressure.

Figure 5:
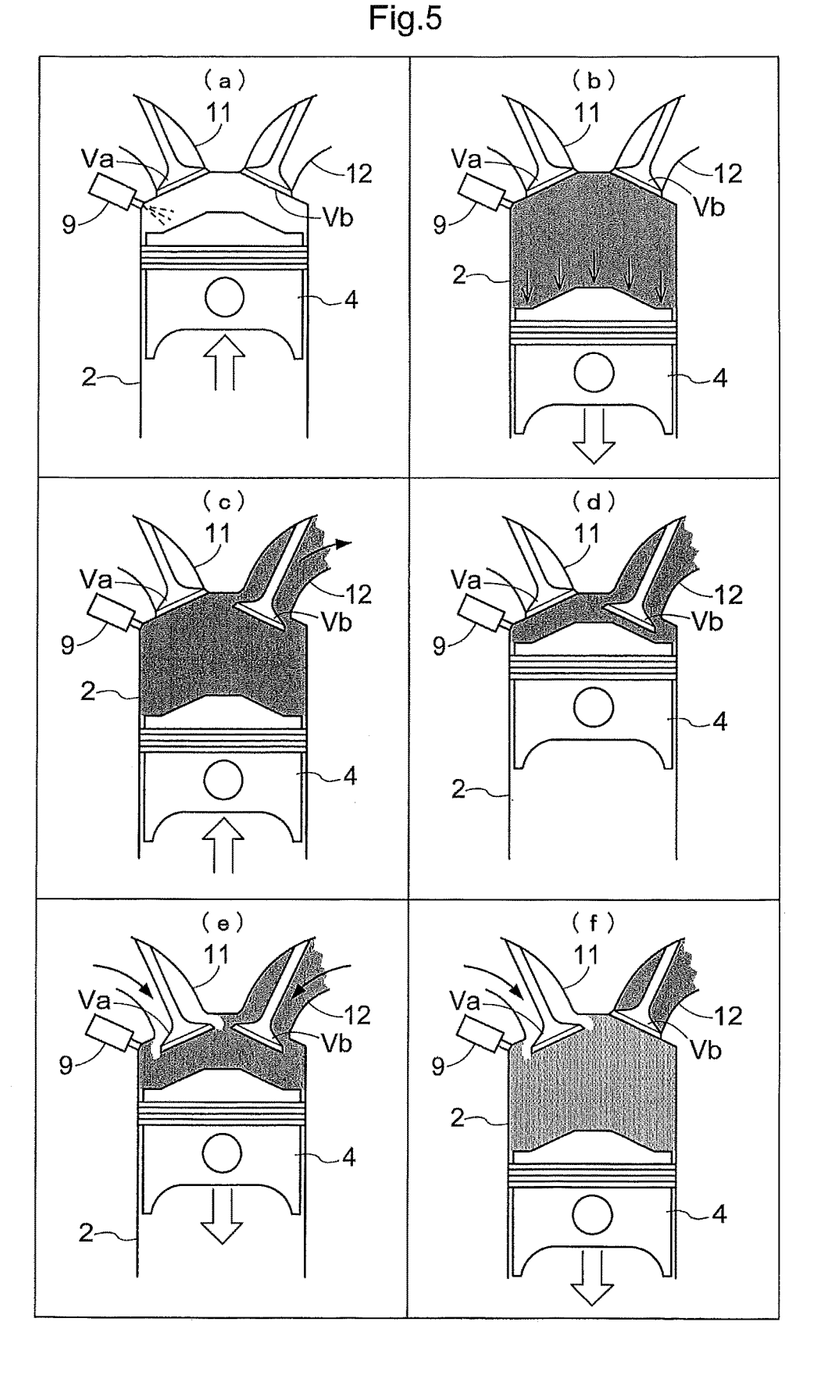
FIG. 5 is a diagram sequentially showing the operations of valves, from the fuel injection to the intake process of the internal combustion engine.

In other words, as shown in FIG. 5 and FIG. 6, when the pressurizing process is performed at the startup of the engine E due to the cranking of the starter motor 15, fuel is injected by the injector 9 to the combustion chamber at the timing (a) in FIG. 5, which is when the piston 4 reaches the top dead center TDC (this timing does not necessarily coincide with the top dead center TDC), and then the spark plug 10 performs ignition, and the transition to the combustion process occurs.

In this combustion process, the intake valve Va and the exhaust valve Vb are in the closed state, as depicted as the timing (b) in FIG. 5. After that, the exhaust valve Vb opens immediately before the piston 4 reaches the bottom dead center BDC, and the open state continues, as depicted as the timings (c) and (d) in FIG. 5. After that, the piston 4 reaches the top dead center TDC, and the intake valve Va opens at the timing (e) in FIG. 5 (the timing at which the transition to the intake process occurs), at which the exhaust valve Vb is maintained in the open state. After that, the intake process continues, and accordingly the exhaust valve Vb closes at the timing (f) in FIG. 5.

In this way, by starting cranking with the exhaust-side valve opening/closing timing control mechanism B being held in the first lock phase LS1, a state is created in which the exhaust valve Vb is kept open in the initial stage of the intake process, which is subsequent to the combustion process. Therefore, when the engine E in the low-temperature state is started up, even if a portion of the fuel injected from the injector 9 adheres to the cylinder inner wall, it is possible to actively cause the portion of fuel to evaporate using the heat of the cylinder inner wall, which has increased in temperature. Then, fuel that has been injected to the combustion chamber and fuel that has evaporated from the cylinder inner wall are burnt, which eliminates the inconvenience of unburned HC discharge and achieves preferable emissions.

[Other Embodiments]

The present invention may be configured differently from the above-described embodiment as shown below.

(a) The relative rotation phase of the first lock phase LS1 of the exhaust-side valve opening/closing timing control mechanism B is set to be the maximum retard phase, or within the range that is close to the maximum retard phase. In other words, the state of maintaining the relationship with which the open state of the exhaust valve Vb continues from when the intake valve Va opens (the relationship with which the overlap range N is formed) is set to be within the range where the relative rotation phase is on the maximum retard phase side of the intermediate phase. With this setting, after the engine E is started up, the range in which the relative rotation phase of the exhaust-side valve opening/closing timing control mechanism B is displaceable in the advance direction Sa can be enlarged.

When the first lock phase LS1 is set on the maximum retard side as in this other embodiment (a), the second lock phase LS2 can also be set to be an intermediate (approximately middle) relative rotation phase.

(b) The present invention can be embodied without the lock mechanism that holds the relative rotation phase in the second lock phase LS2.

(c) A configuration is adopted in which the period of time during which the open state of the exhaust valve Vb continues from the timing when the intake valve Va opens (the period of time during which the overlap range N is formed) can be controlled by controlling the intake-side valve opening/closing timing control mechanism A. With this configuration, it is also possible to set the overlap range N to be a required value according to the state of the engine E.

(d) The internal combustion engine is configured such that the injector 9 is located at the position where fuel is injected from the intake passage side to the combustion chamber when the intake valve Va opens. Even if the injector 9 is located at such a position, it is possible to reduce the unburned HC when the engine E in the low-temperature state is started up.

(e) A configuration is adopted in which, within the range from the first lock phase LS1 to the maximum retard phase, the biasing force acting from the torsion spring 27, which is the biasing mechanism, is applied in the advance direction Sa against the cam average torque applied from the exhaust camshaft 8.

By setting the biasing direction of the torsion spring 27 as in this other embodiment (e), it is possible to displace the relative rotation phase to the advance side (in the advance direction Sa) and causes the transition to the locked state in the second lock phase LS2 when the engine E is started up in a situation where the relative rotation phase is on the advance side of the first lock phase LS1. The exhaust-side valve opening/closing timing control mechanism B improves the startup performance of the engine E by maintaining the relative rotation phase in the second lock phase LS2.

INDUSTRIAL APPLICABILITY

The present invention is applicable to an internal combustion engine that is equipped with a valve opening/closing timing control mechanism that sets the opening/closing timing of an exhaust valve.

REFERENCE SIGNS LIST

1: crankshaft
4: piston
8: camshaft (exhaust camshaft)
9: injector
20: driving rotating body (outer rotor)
25: lock member
26: biasing member (lock spring)
27: biasing mechanism (torsion spring)
30: driven rotating body (inner rotor)
41: phase control valve
42: lock control valve
50: control unit (engine control unit)
56: temperature sensor (ambient temperature sensor)
B: valve opening/closing timing control mechanism
Ca: advancing chamber
Cb: retarding chamber
Ds: regulation depression
E: internal combustion engine (engine)
L: lock mechanism
LD1: lock depression (first lock depression)
LS1: first lock phase
LS2: second lock phase
Va: intake valve
Vb: exhaust valve

The invention claimed is:

1. A control device for an internal combustion engine that includes: a piston that moves between a top dead center and a bottom dead center; a crankshaft; a camshaft; and a combustion chamber, the control device including: an intake valve that opens/closes the combustion chamber such that air flows into the combustion chamber; and an exhaust valve that opens/closes the combustion chamber such that a combustion gas after combustion flows out of the combustion chamber, the control device comprising:
- a driving rotating body to which a rotational force is transmitted from the crankshaft;
- a driven rotating body that is housed within the driving rotating body so as to be rotatable relative to the driving rotating body, and that rotates integrally with the camshaft for opening/closing the exhaust valve;
- a lock mechanism that is switchable among a first locked state, in which a relative rotation phase of the driving rotating body and the driven rotating body is held in a predetermined first lock phase, a second locked state, in which the relative rotation phase is held in a second lock phase that is different from the first lock phase, and an unlocked state, with which the first locked state and the second locked state are released;
- a phase control valve that is capable of controlling the relative rotation phase of the driving rotating body and the driven rotating body, and controlling the locked state caused by the lock mechanism, by supplying/discharging a fluid to/from an advancing chamber or a retarding chamber, which are defined between the driving rotating body and the driven rotating body;
- a control unit that controls the phase control valve; and
- a temperature sensor that detects an ambient temperature,
- wherein when the ambient temperature detected by the temperature sensor is lower than a setting value and the internal combustion engine is to be stopped, the internal combustion engine is stopped after the relative rotation phase transitions to the first locked state by the control unit controlling the phase control valve,
- wherein when the ambient temperature detected by the temperature sensor is greater than or equal to the setting value and the internal combustion engine is to be stopped, the internal combustion engine is stopped after the relative rotation phase transitions to the second locked state by the control unit controlling the phase control valve,
- wherein at starting of the internal combustion engine, opening/closing timings of the intake valve and the exhaust valve are set such that a first open state of the exhaust valve is maintained when the relative rotation phase is held in the first locked state by the lock mechanism and the piston moves from the top dead center toward the bottom dead center, the first open state being maintained longer than a second open state of the exhaust valve, the second open state being maintained when the relative rotation phase is held in the second locked state by the lock mechanism and the piston moves from the top dead center toward the bottom dead center, and
- wherein a valve opening/closing timing control mechanism that includes the driving rotating body, the driven rotating body, and the lock mechanism is provided on an exhaust side, and the first lock phase is set to be an intermediate relative rotation phase.

2. The control device for the internal combustion engine according to claim 1, comprising a biasing mechanism that applies a biasing force to the relative rotation phase such that, under an operating condition where no driving force is caused by fluid pressure, the relative rotation phase is displaced in an advance direction against a cam average torque applied from the camshaft.

3. The control device for the internal combustion engine according to claim 2, wherein, under an operating condition where no driving force is caused by fluid pressure, the biasing mechanism applies a biasing force to the relative rotation phase such that, within a range from a range that is on a retard side of the first lock phase to the first lock phase, the relative rotation phase is displaced in an advance direction.

4. The control device for the internal combustion engine according to claim 1, wherein when the lock mechanism is in a state of holding the relative rotation phase in the first lock phase and the internal combustion engine is started up, the control unit releases the locked state of the lock mechanism upon elapse of a set period of time from startup of the internal combustion engine.

5. The control device for the internal combustion engine according to claim 1, comprising an injector that supplies fuel directly to the combustion chamber.

6. The control device for the internal combustion engine according to claim 1, further comprising a lock control valve, wherein the lock control valve controls the locked state caused by the lock mechanism.

7. The control device for the internal combustion engine according to claim 1,
- wherein the lock mechanism includes: a lock member that is supported so as to be shiftable with respect to one of the driving rotating body and the driven rotating body; a lock depression that is formed in the other one of the driving rotating body and the driven rotating body, and that the lock member is engageable with; and a biasing member that applies a biasing force to the lock member such that the lock member engages with the lock depression, and
- a depth of a regulation depression is smaller than a depth of the lock depression, the regulation depression being continuous with the lock depression and regulating the relative rotation phase from being displaced in a retard direction, due to the lock member engaging therewith.

* * * * *